United States Patent [19]

Solcz et al.

[11] Patent Number: 4,691,212

[45] Date of Patent: Sep. 1, 1987

[54] PIEZOELECTRIC OPTICAL BEAM DEFLECTOR

[75] Inventors: Edward J. Solcz, New York; Gerald A. Domoto, Briarcliff Manor; Barry M. Wolf, Yorktown Heights, all of N.Y.

[73] Assignee: Xerox Corporation, Stamford, Conn.

[21] Appl. No.: 798,091

[22] Filed: Nov. 14, 1985

[51] Int. Cl.$^4$ .................. G01D 9/42; G01D 15/14; H04N 1/21

[52] U.S. Cl. .................. 346/108; 346/160; 358/296

[58] Field of Search .......... 346/108, 160, 76 L, 346/107 R; 358/296; 310/323, 327, 330, 335

[56] References Cited

U.S. PATENT DOCUMENTS

| | | | |
|---|---|---|---|
| 3,614,677 | 10/1971 | Wilfinger | 333/71 |
| 3,836,225 | 9/1974 | Wilde et al. | 350/6 |
| 3,981,566 | 9/1976 | Frank et al. | 350/285 |
| 4,385,798 | 5/1983 | Yevick | 350/96.14 |
| 4,436,364 | 3/1984 | Lauer et al. | 350/6.6 |
| 4,520,370 | 5/1985 | Fuji et al. | 346/108 |

FOREIGN PATENT DOCUMENTS 3035314  4/1982  Fed. Rep. of Germany .
55-28757 10/1981  Japan .
652520   3/1979  U.S.S.R. .

OTHER PUBLICATIONS

Marinace, Electrical Positioning of Lenses, IBM Tech. Disc. Bull., vol. 19, No. 5, p. 1948, Oct. '76.
J. F. Stephany et al; "Bimorph Optical Beam Deflector"; *Applied Optics*; vol. 15, No. 2, Feb. 1976, pp. 307–308.

*Primary Examiner*—E. A. Goldberg
*Assistant Examiner*—Mark Reinhart
*Attorney, Agent, or Firm*—Robert A. Chittum

[57] ABSTRACT

A piezoelectric bimorph scanner is disclosed which has a flexural beam attached to the free end of a cantilever mounted piezoelectric bimorph crystal. A mirror is bonded to the flexural beam a predetermined distance from the bimorph crystal. An AC voltage of predetermined frequency is applied to the bimorph crystal causing the flexural beam to oscillate with a node at the center of the mirror. The mirror rotates about the node rather than swinging in an arc, enabling the scanner to deflect a collimated light beam over a larger deflection angle than heretofore possible without additional light beam control apparatus. In an alternate embodiment, a laser diode may be mounted on the flexural beam instead of the mirror, further reducing costs and components.

9 Claims, 8 Drawing Figures

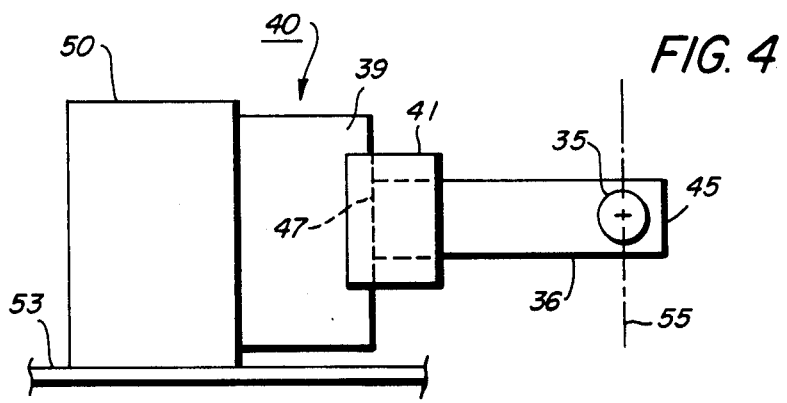
FIG. 4
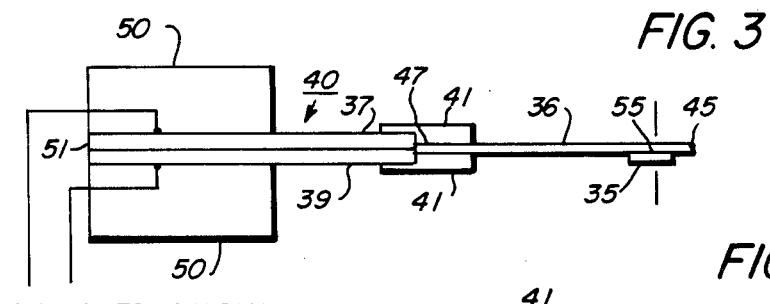
FIG. 3
A.C. POWER SUPPLY
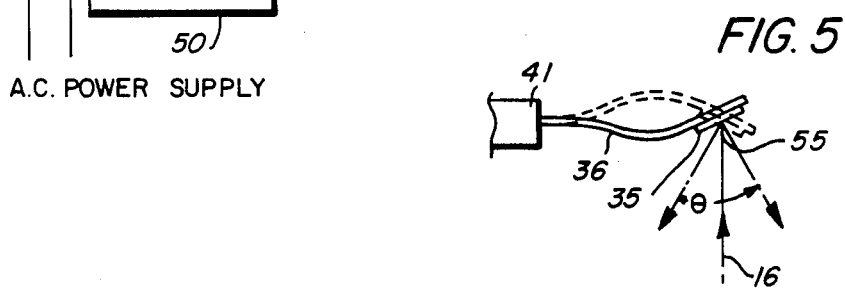
FIG. 5
FIG. 6
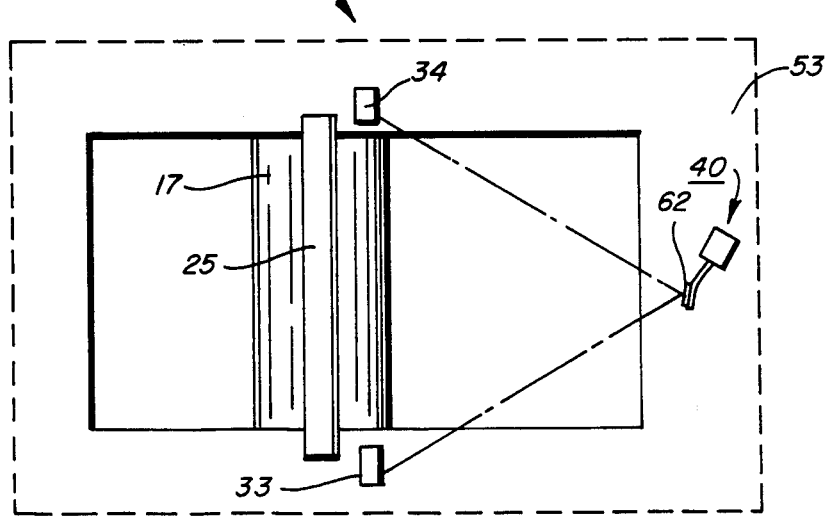

PIEZOELECTRIC OPTICAL BEAM DEFLECTOR

BACKGROUND OF THE INVENTION

1. Field of the Invention

This invention relates to laser scanning systems and more particularly to a laser scanning system utilizing a bimorph optical beam deflector.

2. Description of the Prior Art

Bimorph optical beam deflectors for use in laser scanning systems and fiber optic scanning systems have been in existence for sometime. However, one major shortcoming is that the existing bimorph beam deflectors generally produce relatively small light beam deflections and they usually exhibit first mode oscillation, so that a mirror attached to the cantilevered end of the bimorph deflector travels through an arc and is physically displaced from one extreme end of the arc to the other. This physical displacement necessitates the need for further optical path controls to cause the reflected light beam to scan the appropriate area.

The article entitled "Bimorph Optical Beam Deflector" by J. F. Stephany et al, *Applied Optics,* Vol. 15, No. 2, February, 1976, Pages 307 and 308, disclose the typical bimorph light beam deflector with first mode oscillation. This article shows that some improvement in deflection angle is obtained by reducing the thickness of the piezoelectric layers of the bimorph crystal and by increasing the applied voltage thereto.

Russian Certificate of Invention No. 652,520 to Ashmarin et al, Mar. 18, 1979, discloses two cantilevered bimorph strips which are mutually perpendicular to each other with confronting loose ends engaging mutually perpendicular slots in opposing faces of a cubical member. Two adjacent perpendicular faces of the cubical member that are located between the slotted faces have photocells thereon which deflect light beams as the required angles. The bimorph strips oscillate in the first mode as disclosed in the above article by Stephany et al.

U.S. Pat. No. 3,614,677 to Wilfinger discloses a cantilevered semiconductor substrate capable of flexing in response to a change in temperature and is adapted to prompt flexing vibration predominantly at a resonant frequency in response to a heating means. An embodiment at FIG. 10 shows the substrate as a light deflection device which oscillates in the first mode.

U.S. Pat. No. 3,836,225 to Wilde et al discloses a fiber optic scanner. In FIG. 3, a bimorph transducer deflects horizontally about its longitudinal axis pivoting about its clamped end, when a sinusoidal voltage is applied. The fiber optic bundle is in the center of the bimorph transducer and along its longitudinal axis so that the first mode oscillation or repetitive horizontal deflection of the bimorph transducer sweeps the fiber optic bundle ends across the receiving fiber optics.

Japanese Patent Application No. 55-28757 to Kondou, published Oct. 2, 1981 without examination as Laid Open No. 56-125719, discloses a piezoelectric oscillator resting on supports near the ends thereof and having a mirror cantilevered from one of the end. The oscillator is oscillated in a manner so as to flex the oscillator centrally up and down over the supports. In this way, the flexing is produced with nodes at the supports. Although not operating in the first vibrating mode as in the above-mentioned prior art, this case does not mount the mirror at a node as is done in the present invention. Instead, Kondou discloses cantilevering the mirror at one end of the oscillator.

German Patent Application No. 30 35 314 A1 to Lauer, published without examination on Apr. 1, 1982 and assigned to Erwin Sick Gmbh Optik-Elektronik, discloses a resilient sheet attached at each end "A" and "C" which is oscillated by piezoelectric strips attached to the sheet between end A and a point B which is intermediate end C. Sheet end A is fixed and sheet end C is restrained by a strut. A mirror is attached at sheet end C. When the piezoelectric strips are excited by an A.C. voltage, the resilient sheet flexes about nodes B and C. However, the mirror at point C cannot remain on the horizontal axis of the resilient sheet for large deflections because this node is physically constrained by strut CD. The strut causes vertical motion of point C for large angular deflections of the mirror. In addition, this strut stiffens the system making it more difficult to drive.

U.S. Pat. No. 4,436,364 to Lauer et al discloses two coplanar cantilevered piezo-ceramic strips which have the free ends confronting each other and spaced apart a predetermined distance. A mirror is mounted via flexible legs to the free ends of the piezo-ceramic strips so that when an A.C. voltage is used to energize the strips in counterphase to one another, the mirror is moved with a rotary oscillation as the result of the counterphase movements of the free ends of the strips.

U.S. Pat. No. 4,385,798 to Yevick discloses the use of two cantilevered bimorph transducers, one of which has a free end that oscillates in one direction while the other end is attached to the other bimorph transducer's free end. This latter transducer free end oscillates in a direction perpendicular to the oscillation direction of the first transducer. A light pipe is centrally positioned through both bimorph transducers so as to directly project visible light on a viewing screen.

U.S. Pat. No. 3,981,566 to Frank et al discloses a hinged mounted linkage to couple a light beam deflecting mirror to the free end of a cantilevered bimorph transducer. The linkage employs flexible hinges to eliminate looseness between the mirror and the bimorph driver.

SUMMARY OF THE INVENTION

It is an object of the present invention to provide a piezoelectric or bimorph laser scanner which eliminates the prior art limitation of restricted deflection angle and which eliminates the physical displacement of the beam deflecting mirror that ordinarily necessitates further laser beam control apparatus.

In the present invention, a piezoelectric bimorph crystal is fixedly mounted at one end and a flexural beam is mounted on the free end in a cantilevered fashion. A mirror is mounted near the free end of the beam. An alternating current voltage is applied the bimorph, which consists of two piezoelectric elements bonded face to face. When voltage is applied to the elements, the voltage causes one element to expand and the other to contract and thus form an arc. This action is analogous to that of a bi-metallic strip subjected to a change in temperature. Scanning is accomplished by driving the beam at a desired scan frequency. The scan amplitude is maximized by sizing the flexural beam to have a natural resonance at the desired scan frequency. Further, to minimize the scan error, this natural frequency is chosen so that the beam vibrates in one of its higher natural modes. In this mode, existence of a node is ensured; that is, there exists a point on the beam which experiences rotation without translation. Since a form of scan errors occurs when the axis of rotation for the reflecting surface does not intersect the surface, positioning the mirror or reflecting surface at the node virtually eliminates this error. This form of spot placement error is unavoidable with, for example, a polygon spinner or a prior art bimorph scanner.

The configuration of the present invention and its associated mode of operation differentiate it from all previously known piezoelectric scanners. The prior art piezoelectric scanners often have their mirrors mounted directly on the piezoelectric crystal and operate near the fundamental resonance of the device, so that the mirror swings along an arc, commonly referred to as first mode oscillation. Other prior art piezoelectric scanners use jewel bearings or precision fulcrums with the mirror mounted on a lever to achieve larger deflections. Such conventional piezoelectric scanners are expensive because of this complex design. The main advantage of the present invention is achieved by using the combined dynamics of the bimorph-flexural beam system to amplify the scanning and the location of the mirror thereon at a node so that it rotates instead of translates. Driving the system near resonance also lowers the level of excitation required.

In an alternate embodiment a solid state laser diode may be placed on the flexural beam instead of a mirror. In this configuration, it is possible to eliminate some of the peripheral hardware required by the piezoelectric scanners; specifically, some of the lenses, mirrors, and possibly the optical modulator would be eliminated.

BRIEF DESCRIPTION OF THE DRAWINGS

FIG. 3 is a plan view of the piezoelectric bimorph scanner of the present invention.

FIG. 4 is a side view of the scanner shown in FIG. 3.

FIG. 5 is a plan view of a portion of the scanner showing th4e movement of the flexural beam by showing extreme positions thereof, one being in dashed lines in order to depict the mirror rotation about its central axis.

FIG. 6 is a schematic plan view of a printer showing an alternate embodiment of the present invention.

While the present invention will be described hereinafter in connection with a preferred embodiment, it will be understood that it is not intended to limit the invention to that embodiment. On the contrary, it is intended to cover all alternatives, modifications and equivalents as may be included within the spirit and scope of the invention as defined by the claims.

DESCRIPTION OF THE PREFERRED EMBODIMENT

Figure 1:
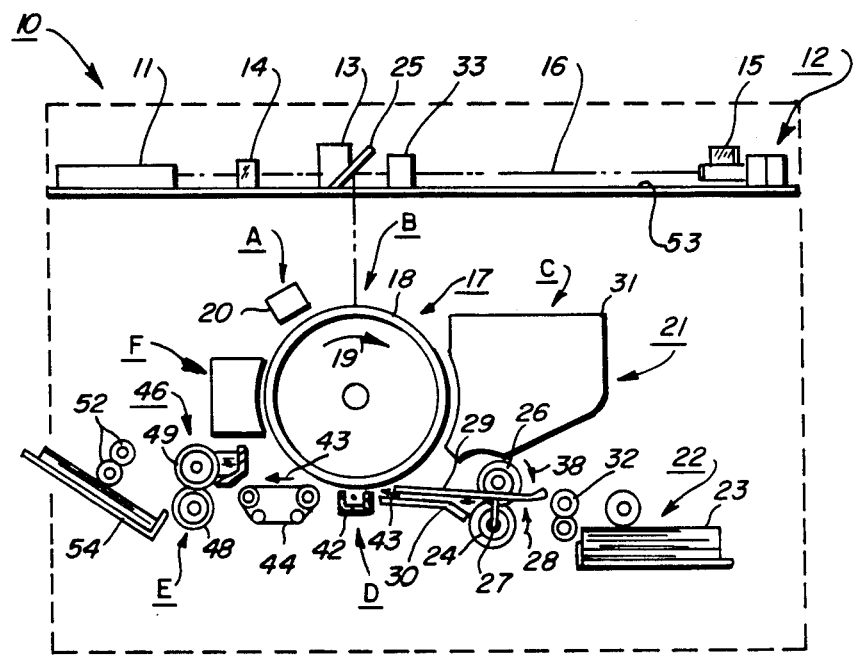
FIG. 1 is a schematic side view of an electrophotographic printer incorporating the present invention.
Figure 2:
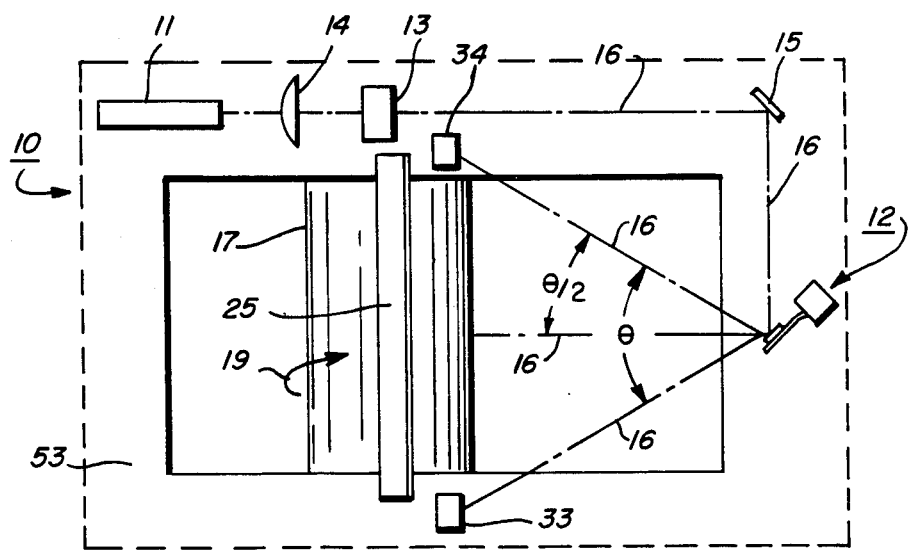
FIG. 2 is a schematic plan view of the printer in FIG. 1 with the process stations removed.

In FIGS. 1 and 2, a typical electrophotographic printer 10 is schematically shown incorporating the piezoelectric bimorph scanner 12 of the present invention, together with its associated components; namely, laser 11, optical modulator 13 and lens system 14. Since electrophotographic printers are well known in the art, the various processing stations are represented schematically. Although the photoconductive member 17 is shown as a conductive drum with a photoconductive surface 18 rotated in the direction of arrow 19 through various processing stations, it could also be an endless belt (not shown) entrained about rollers. The photoconductive member rotates through charging station A which employs a corona generating device indicated generally by the reference numeral 20. The corona generating device charges the photoconductive surface to a relatively high uniform potential. This precharged photoconductive surface is then rotated through the exposure station B whereat the electrostatic latent image is formed one line at time by the bimorph scanner 12 more fully described later. Radiation of the charged portion of the photoconductive surface by the bimorph scanner records an electrostatic latent image corresponding to the information of the modulated light beam deflected or scanned across the photoconductive member. The photoconductive member rotates the electrostatic latent image recorded on the photoconductive surface to development station C. Development station C includes a developer unit indicated generally by the reference numeral 21 having a housing 31 with a supply of developer mix (not shown) contained therein. The developer unit 21 is preferably a magnetic brush development system and accordingly the developer mix comprises carrier granules formed from a magnetic material with triboelectrically charged toner particles adhering thereto. As is well known in the art, the toner particles are made from a heat settable plastic. A system of this type moves the developer mix through a directional flux field to form a brush thereof. The electrostatic latent image recorded on the photoconductive surface is developed by bringing the brush of developer mix into contact therewith. In this manner, the toner particles are attracted electrostatically from the carrier granules to the latent image forming a toner powder image on the photoconductive surface, thus developing the latent image.

A copy sheet 23 is advanced by sheet feeding apparatus 22 to transfer station D from a stack of sheets. Sheet feeding apparatus 22 advances successive copy sheets to the nip of registration roller 24 and idler 26 via drive rolls 32. Registration roller 24 is driven by a motor not shown in the direction of arrow 28 and idler roller 26 rotates in the direction of arrow 38 since roller 24 is in contact therewith. In operation, sheet feed device 22 operates to advance the uppermost sheet from a stack of sheets into registration rollers 24 and 26 and against registration fingers 27. Fingers 27 are actuated by conventional means and in timed relation to the image on the photoconductive member such that the sheet resting against the fingers at the nip of registration roller 24 and idler roller 26 is forwarded toward the photoconductive member in synchronism with the image thereon. The sheet is advanced in the direction of arrow 43 through a chute formed by guides 29 and 30 to transfer station D. The detailed structure of a conventional registration control system such as roller 24 and 26 and fingers 27 is described in U.S. Pat. No. 3,902,715.

Continuing now with the various processing stations, transfer station D includes a corona generating device 42 which applies a spray of ions to the back side of the copy sheet. This attracts the toner image from the photoconductive surface to the copy sheet. After transfer of the toner powder image to the copy sheet, the sheet is advanced by endless belt conveyor 44 in the direction of arrow 43 to fusing station E.

Fusing station E includes a fuser assembly indicated generally by the reference numeral 46. Fuser assembly 46 includes a fuser roll 48 and back-up roll 49 defining nip therewith in between through which the copy sheet passes. After the fusing process is completed, the sheet is advanced by a pair of rollers 52, which may be similar to the registration roller 24 and 26, to catch tray 54.

Invariably, after the copy sheet is separated from the photoconductive surface some residual toner particles remain adhering thereto. These toner particles are removed from the photoconductive surface at cleaning station F. Cleaning station F includes a corona generating device not shown adapted to neutralize the remaining electrostatic charge on the photoconductive surface and other residual toner particles. The neutralized toner particles are then cleaned from the photoconductive surface by a rotatably mounted brush (not shown) in contact therewith. Subsequent to entry into the cleaning station, a discharge lamp, not shown, floods photoconductive surface 18 with light to dissipate any residual electrostatic charge remaining thereon prior to the charging thereof for the next successive imaging cycle.

For clarity, the process stations have been omitted from the plan view of the electrophotographic printer shown in FIG. 2. The optical modulator 13 may be any electro-optic or acousto-optic modulator capable of modulating a beam of light in accordance with digitized data signals received from a character generator or electrophotographic printer controller (not shown). Reflectors or mirrors 15 and 25 direct the modulated laser beam to the bimorph scanner 12 and photoconductive member 17. The bimorph scanner 12, more fully described later, deflects the modulated beam of light through an arc "$\theta$" between a start of scan detector 33 and an end of scan detector 34. The arc $\theta$ is about 20 degrees in the preferred embodiment but, of course, could be made to sweep an arc greater than 20 degrees.

Referring to FIGS. 3 and 4, the piezoelectric bimorph scanner of the present invention consists of a mirror 35 mounted on end 45 of a flexible beam 36 which is driven by a piezoelectric bimorph crystal 40. The opposite end 47 of the flexible beam is abutted against the free end of the cantilever mounted bimorph crystal and bonded thereto by notched plates 41. The crystal consists of two piezoelectric elements 37, 39, bonded face to face and is mounted in a cantilever fashion by support blocks 50 fixedly attached to end 51 of the bimorph crystal. The support blocks are adjustably attached to the printer frame 53. A voltage is applied to the electrodes causing one element to expand and the other to contract, thus, forming an arc. This action is analogous to that of a bimetallic strip subjected to a change in temperature Scanning is accomplished by driving the beam 36 at a desired scan frequency. The scan amplitude is maximized by sizing the flexural beam to have a natural resonance at the desired scan frequency. Further, to minimize the scan error, this natural frequency is chosen so that the beam vibrates in one of its higher natural modes. In this mode, the existence of a node is ensured. That is, there exists a line 55 on the beam 36 about which the mirror rotates without translation. In FIG. 5, the beam is shown with its maximum flexure in one direction in solid line and with its maximum flexure in the other direction in dashed line. Note that the beam node causes the mirror 35 to rotate about line 55 which is perpendicular to the surface of page containing FIG. 5. Thus, as the mirror rotates about line 55, optical beam 16 is deflected at least one half $\theta$ on each side of the impinging optical laser beam 16 on the mirror. Therefore, the configuration and associated mode of operation differentiate the present invention from the prior art piezoelectric bimorph scanner. The prior art piezoelectric bimorph scanner often have their mirrors mounted directly on the crystal and operate near the fundamental resonance of the device, producing first mode oscillation. The main advantage of the present invention is achieved by using the combined dynamics of the bimorph crystal flexural beam system to amplify the scan angles. Driving the system near resonance also lowers the level of excitation required to less than 80 volts A.C. Further, mounting the mirror at the structural node of the beam causes the mirror to rotate rather than swing through an arc. Since the mirror only rotates, it avoids first mode oscillation, so that additional optical beam control techniques are not required.

An alternate embodiment of the present invention is shown in FIG. 6, where like reference numerals will be employed to depict identical elements. In this embodiment, a solid state laser diode 62 is used in place of the mirror 35, thereby eliminating the need for some of the peripheral hardware required by the piezoelectric bimorph scanner of FIGS. 3 and 4. Specifically, the lens system 14 and the optical modulator 13 could be eliminated. The laser beam emitted by the laser diode is modulated by varying the energizing current applied to the laser diode by means well known in the art in response to digitized data signals representing information to be latently printed on the photoconductive member 17 of the printer 60. Not shown is a one millimeter long GRIN (graded refractive index rod) lens mounted to the diode laser 62 for correction of any beam divergence in the fast scan direction. A reflector 25, preferably cylindrical, is used to focus the beam to a small spot in the slow scan direction. Generally, the laser should emit light in the near visible range in order to be compatible with the current electrophotographic printer photoconductive members.

Figure 8:
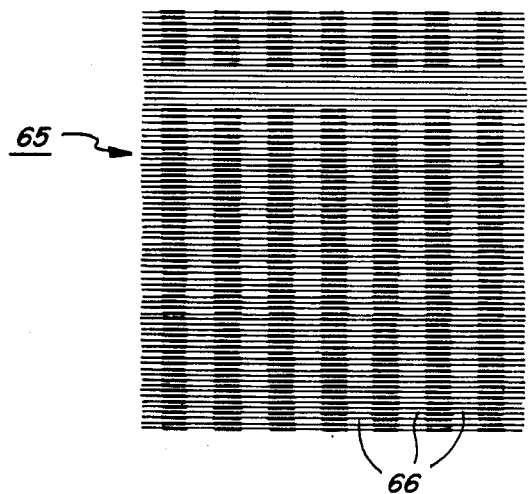
FIG. 8 is a test pattern generated by a constant frequency driver for the acousto-optic modulator showing scan repeatability from line to line.

In one early experimental demonstration of the embodiment in FIGS. 1 and 2, a Xerox 1020 copier was modified and used to evaluate scanner motion quality. It was found that the scanned laser beam 16 across the photoconductive member 17 was uniform and repeatable. The fast scan direction is horizontal, that is, the direction of the scan from the start of scan detector 33 to end of scan detector 34, and the slow scan direction is vertical, that is, in the direction of the photoconductive member advance, arrow 19. A test pattern 65, shown in FIG. 8, was generated by using a constant frequency driver to control an acoustooptic modulator. The driver was triggered with a conventional start of scan detector. Since the driver operates at a constant frequency and the start of scan detector is stationary the exposed fields formed grey stripes 66 in the slow scan direction. The edges of the stripes form straight lines in a vertical direction. This provides evidence that the scan is repeatable from line to line with a worse case spot placement error approximately plus or minus 0.005 inches (125 microns). The horizontal spacing or black stripes 67 between the grey fields provides an indication of the uniformity of the scan speed across the page. This demonstrates that the motion has uniform scan velocity in the fast scan direction. The spacing between the vertical bars does not vary more than 0.005 inches (125 microns). The scan frequency for this demonstration was 400 hertz with a scan beam amplitude of 6.25 inches (159 mm). The distance from the imaging plane at the photoconductive member to the scanner mirror 35 was 22 inches (559 mm) corresponding to a light beam deflection of roughly 32 degrees. The scan frequency divided by the process speed gives the scan density in the slow scan direction which in this cse was 73 spots per inch (spi) or 3 spots per mm.

In other tests, full pagewidth lines were scanned. From 400 hertz up to 900 hertz, the change in velocity across the scan during close loop operation is less than 3% without the use of corrective optics. Open loop scanner optics has reduced scan velocity errors of less than 10% without corrective optics. The end of scan spot placement error is less than 5 pixels assuming 300 spi during open loop operation. A closed loop control technique corrects this error.

Figure 7:
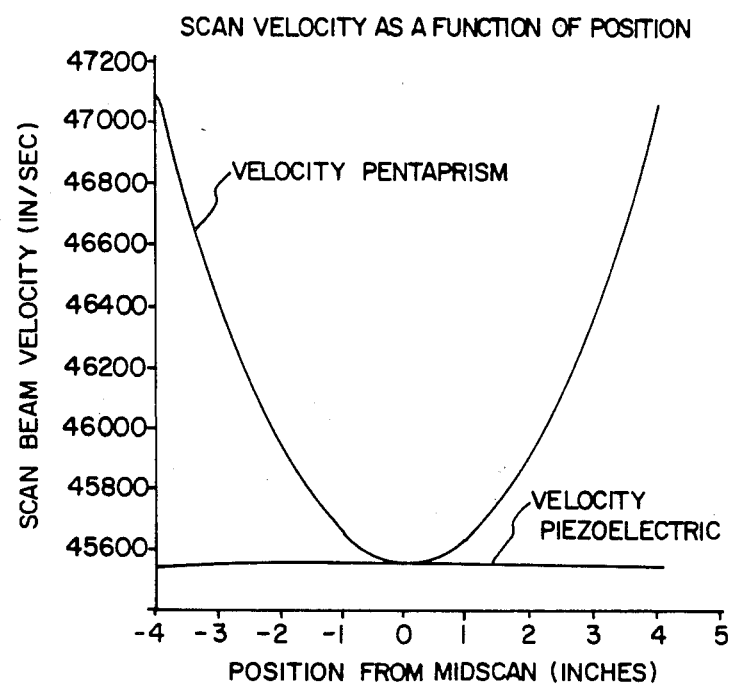
FIG. 7 is a grph comparing the scan velocity of the present invention to that of a spinning pentaprism.

An additional feture of the scanner of the present invention is that the light beam velocity across the photoconductive member surface is more constant than that possible with a polygon spinner or a prior art bimorph scanner. Using a polygon spinner, the light beam velocity is maximum at the extremes and a minimum at the mid-scan position. This is due to the constant angular velocity of the polygon spinner and variable radius arm from the center of rotation to the imaging plane. With the present invention, the velocity across the page varies from a mimimum at the outer extremes of the scan to a maximum at the new scan position. However, since the scan velocity is not a linear function of the piezoelectric crystal driving amplitude, it is possible to optimize the device parameters and generate a near constant beam velocity across the imaging surface. Thus, the need for corrective optics may be elminated. FIG. 7 shows some results of an analytical model comparing the scan velocity of the present invention to that of a pentaprism spinner as a function of the position along the scan lens. In this model, the spinner and the piezoelectric bimorph scanner both operate at the same frequency and the results are normalized, so that both have the same velocity at the center of scan.

In summary, the present invention has the ability to function as a laser scanner with a light beam output that is uniform and repeatable. The scanner configuration is simple with no moving mechanical parts such as bearings, rotors, links, pivots, etc. Translational spot placement errors are eliminated and scan velocity across the plane is nearly constant. The scanning frequency can be easily varied by changing the dimension of the flexural beam and the scan is identical in both directions, therefore, the piezoelectric device of the present invention may write in both directions, therefore, doubling the operating frequency (i.e. bi-directional writing).

In recapitulation, the piezoelectric bimorph scanner of the present invention has a centilevered flexural beam on which a mirror is mounted a predetermined distance from the bimorph crystal. The A.C. voltage applied to the bimorph crystal causes the flexural beam to oscillate at resonance with a node at the center of the mirror. This enables the scanner to deflect a beam over a larger deflection angle than heretofore possible with prior art bimorph scanners. In addition, the mirror rotates about the node rather than swinging through an arc. This eliminates the need for additional light beam control apparatus. In an alternate embodiment, a laser diode is mounted on the flexural beam of the bimorph scanner instead of a mirror. This further reduces costs and components, such as a separate laser and an optical modulator.

It is therefore evident, that there has been provided in accordance with the present invention, a bimorph scanner which fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and scope of the appended claims.

We claim:

1. A piezoelectric laser scanner for use as an optical beam deflector in an electrophotographic printer having a moving photoconductive member, comprising:
    a piezoelectric bimorph crystal being mounted on a support member in a cantilevered fashion with one end of the bimorph crystal being free to oscillate along an arc;
    a flexural beam having one end thereof in abutting contact with the free end of the bimorph crystal;
    means for attaching the flexural beam to the bimorph crystal, so that their abutting ends are fixed together;
    a mirror being bonded to the flexural beam at predetermined distance from the bimorph crystal free end;
    means for fixedly mounting the support member to the printer;
    means for applying an AC voltage of predetermined frequency to the bimorph crystal to drive said bimorph crystal causing the flexural beam to oscillate at resonance with a node formed substantially at the center of the mirror, so that the mirror rotates about the node without translation; and
    means for direction a laser beam of modulated light to the center of the rotating mirror for deflection thereby across the photoconductive member of said printer, the modulated light containing digital information therein for forming electrostatic latent images on the photoconductive member.

2. The scanner of claim 1, wherein the laser beam directing means comprises:
    a laser for emitting the laser beam;
    an acousto-optical modulator for modulating the laser beam passing therethrough in accordance with digitized data signals received thereby; and
    a lens means for collimating and directing the laser beam from the laser to the acousto-optical modulator.

3. The scanner of claim 2, wherein the scanner further comprises at least one reflector for directing the modulated laser beam from the modulator to the m rror on the flexural beam.

4. The scanner of claim 2, wherein the acousto-optical modulator is replaced with an electro-optical modulator.

5. The scanner of claim 1, wherein the scanner further comprises a means for detecting a start of scan and a means for detecting an end of scan of the laser beam as it scans across the photoconductive member.

6. The scanner of claim 5, wherein the scanner further comprises circuitry for use with the start of scan means and the end of scan means to enable bidirectional scanning of the photoconductive member by the modulated laser beam, so that a latent image may be produced on the photoconductor member by either direction of movement of the modulated laser beam thereacross.

7. A piezoelectric laser scanner for use as an optical beam deflector in an electrophotographic printer having a moving photoconductive member, comprising:
- a piezoelectric bimorph crystal being mounted on a support member in a cantilevered fashion with one end of the bimorph crystal being free to oxcillate along an arc;
- a flexural beam having one end thereof in abutting contact with the free end of the bimorph crystal;
- means for attaching the flexural beam to the bimorph crystal, so that their abutting ends are fixed together;
- a solid state laser diode being bonded to the flexural beam at a predetermined distance from the bimorph crystal free end;
- means for fixedly mounting the support member to the printer;
- means for energizing the solid state laser diode so that it emits a laser beam directed towards the photoconductive member;
- means for modulating the emitted laser beam in response to digitized data signals; and
- means for applying an AC voltage of predetermined frequency to the bimorph crystal to drive said bimorph crystal causing the flexural beam to oscillate at resonance with a node formed substantially at the center of the solid state laser diode, so that the solid state laser diode rotates about the node without translation and its modulated laser beam is oscillated across the photoconductive member forming electrostatic latent images thereon one line at a time.

8. The scanner of claim 7, wherein the scanner further comprises:
- a cylindrical reflector being positioned parallel to the photoconductive member, said reflector intercepting the modulated laser beam emitted from the solid state laser diode and focusing it as a relatively small spot on the photoconductive member; and
- a graded refractive index rod lens being mounted to the solid state laser diode for correction of any emitted beam divergence.

9. The scanner of claim 3, wherein the scanner further comprises a second reflector for directing the modulated laser beam from the mirror on the flexural beam to the photoconductive member.

* * * * *